United States Patent
Seiler

(10) Patent No.: US 8,803,902 B2
(45) Date of Patent: Aug. 12, 2014

(54) COMPUTING LEVEL OF DETAIL FOR ANISOTROPIC FILTERING

(75) Inventor: Larry Seiler, Boylston, MA (US)

(73) Assignee: Intel Corporation, Santa Clara, CA (US)

(\*) Notice: Subject to any disclaimer, the term of this patent is extended or adjusted under 35 U.S.C. 154(b) by 697 days.

(21) Appl. No.: 12/629,982

(22) Filed: Dec. 3, 2009

(65) Prior Publication Data

US 2011/0134136 A1    Jun. 9, 2011

(51) Int. Cl.
*G09G 5/00* (2006.01)

(52) U.S. Cl.
USPC .................................................. 345/582

(58) Field of Classification Search
USPC ........................................... 345/582–588
See application file for complete search history.

(56) References Cited

U.S. PATENT DOCUMENTS

| 6,292,193 B1 * | 9/2001 | Perry et al. .................. 345/582 |
| 7,369,136 B1 * | 5/2008 | Heckbert et al. ............ 345/582 |
| 7,558,400 B1 * | 7/2009 | Toksvig et al. ............. 382/100 |

OTHER PUBLICATIONS

McCormack et al., Feline: Fast Elliptical Lines for Anisotropic Texture Mapping, SIGGRAPH '99: Proceedings of the 26th Annual Conference on Computer Graphics and Interactive Techniques, 1999, pp. 243-250.*
Foley et al., Computer Graphics: Principles and Practice, Second Edition in C, Addison-Wesley Publishing Company, Oct. 2006, pp. 1094-1097.*

\* cited by examiner

*Primary Examiner* — Xiao Wu
*Assistant Examiner* — Charles Tseng
(74) *Attorney, Agent, or Firm* — Trop, Pruner & Hu, P.C.

(57) ABSTRACT

Anisotropic filtering may be done in graphics processing without actually have to calculate the elliptical weighted averaging ellipse. Instead, an estimate may be used for the length of the minor axis. The estimate avoids the complexities inherent in the elliptical weighted averaging ellipse calculation and reduces overhead, while still obtaining sufficient accuracy.

10 Claims, 1 Drawing Sheet

COMPUTING LEVEL OF DETAIL FOR ANISOTROPIC FILTERING

BACKGROUND

This relates generally to computer processing and, particularly, to graphics processing.

In graphics processing, pixels in screen space must be projected or mapped into texture space in order to be textured. A 2×2 stamp or quad of pixels is projected from the x,y screen space to the u,v texture space. The projection of the original pixels results in four sample points within the texture space. The four texels around each sample point are then filtered to return four filtered colors, one per sample.

If the projections land near each other, all of the texels between the projections contribute to the final color, yielding a projection that avoids aliasing artifacts. If the projections land too far away from one another, the texels between the sample points do not contribute to the final color. This results in low quality, due to aliasing. If the projections are similar distances from each other, this may be solved through mipmapping. If the projections are not at similar distances from each other then mipmapping to avoid aliasing results in low quality by introducing blurring. Anisotropic filtering must be used in this case to avoid both aliasing and blurring artifacts.

Anisotropic filtering enhances the image quality of texels on surfaces that are at oblique viewing angles, with respect to the camera, where the projection of the texture appears to be non-orthogonal. Anisotropic filtering may reduce or eliminate aliasing effects without introducing blurring.

DETAILED DESCRIPTION

Anisotropic filtering is typically implemented by blending the results of multiple, ordinary bi-linear or tri-linear texture filters. This blending involves computing a level of detail and a number of texture samples to use, so that the texel region covered by the samples avoids or reduces aliasing artifacts.

Elliptical weighted averaging defines an ellipse that represents the warped filter region in the texture. Elliptical weighted averaging computes the desired level of detail and number of samples based on the minor or major axis lengths of the elliptical weighted averaging ellipse. However, doing true elliptical weighted averaging is so costly that it is not used in graphics processing units.

In accordance with some embodiments, a close approximation to the elliptical weighted averaging ellipse major or minor axis lengths can be developed, which produces a relatively high quality level of detail and number of sample positions for anisotropic texture filtering, without the cost in terms of chip area that would be associated with using true elliptical weighted averaging.

Elliptical weighted averaging creates an ellipse from two gradient vectors that define a texture warp at a given sample position. The texture warp is basically the warping of the image in screen space to texture space. The two vectors can be defined as (dudx, dvdx) and (dudy, dvdy). The dudx and dvdx terms represent the distance along the U and V axes in texture space that corresponds to moving one pixel along the X axis in pixel space. The other two terms are defined similarly for moving one step along the Y axis in pixel space.

The approximate major and minor axis lengths can be computed from these gradients. The approximate axis lengths are wrong by a factor of up to the square root of 2, but the products of these lengths exactly equals the product of the correct or true elliptical weighted average lengths. Therefore, the correct axis lengths can be found by computing a correction factor that is multiplied by one axis length and divided by the other axis length. This enables computing corrected elliptical weighted average based level of detail and number of samples without incurring the cost, in terms of chip area, that would be inherent in using true elliptical weighted averaging.

The correction factor is independent of the absolute size or angle of the ellipse. Instead, the correction factor depends on the relative lengths of the approximate minor and major axes and the cosine of the angle between the gradient vectors, both of which are values in the range of zero to one. Thus, a simple approximation of the exact correction factor results in major or minor axis lengths within about two percent of the true values. As a result, a close approximation can be computed efficiently.

Figure 1:
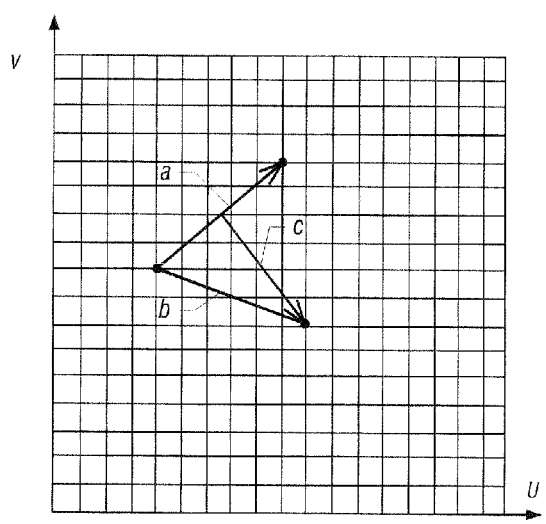
FIG. 1 is a depiction of the screen space to texture space mapping in accordance with one embodiment.

The approximate major and minor axis lengths can be implemented, with reference to FIG. 1, by taking the longer vector a as the major axis length. The height c of the shorter vector b above the vector a is taken as the minor axis length. The height c can be calculated as the absolute value of dudx*dvdy−dvdx*dudy divided by the length of the vector a. The height c is taken as the approximate minor axis length.

These approximate major and minor axis lengths can be different by a factor of the square root of 2 from the correct elliptical weighted average major and minor axis lengths. Nonetheless, the product of these approximate major and minor axis lengths is equal to the product of the actual elliptical weighted average major and minor axis lengths. Thus, both of the assumed lengths are off by the same factor, but in opposite directions. This factor only depends on the relative lengths of the two vectors a and b and the angle between them. Thus, a four variable problem, depending on dudx, dvdx, dudy, and dvdy, has been reduced to a two variable problem.

While a precise correction is reasonably complicated and perhaps unfeasible, an approximation can be used which can be implemented in a practical way. The cosine of the angle between the two vectors and the ratio of their lengths are both constrained to the range zero to one. Therefore, they can be efficiently represented as fixed point numbers. The product of the cosine of the angle between the vectors times the square of the ratio of their lengths is also a value from zero to one. Therefore those multiplications can also be computed in efficient fixed point arithmetic. This product is then scaled from the range [0 . . . 1] to the range [1 . . . sqrt(2)] to produce the approximate correction factor that is multiplied times the major axis length and divided by the minor axis length. The result is axis lengths within about two percent of the true elliptical weighted average major or minor axis lengths.

In some embodiments, the calculation may be implemented instead by a lookup table. In other embodiments, similar equations may be used to produce an approximate correction factor based on the two variables of the relative lengths of the vectors and the angle between them.

Figure 2:
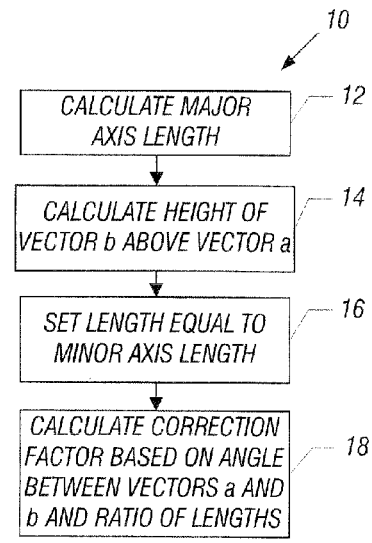
FIG. 2 is a flow chart for one embodiment of the present invention.

Thus, referring to FIG. 2, the sequence 10 there depicted may be implemented in hardware or software. In a software implementation, a sequence of instructions may be stored in a computer readable medium. Suitable computer readable mediums include any storage, including magnetic, optical, or semiconductor memories. The sequence of instructions stored in such a computer readable medium is executed by a computer or processor. That computer or processor may be a general purpose processor or a graphics processing unit, as two examples. Initially, the length of the major axis is calculated, as indicated in block 12. The longer of the two vectors is selected to be the vector a. Then, the height of the vector b, above the vector a, is calculated, as indicated in block 14. Next, the height of the vector b, above the vector a, is set equal to the minor axis length, as indicated in block 16. Finally, a correction factor is calculated based on the angle between the vectors a and b and the ratio of their lengths, as indicated in block 18. This correction factor, as previously described, is then multiplied by the major axis length and divided by the minor axis length.

Figure 3:
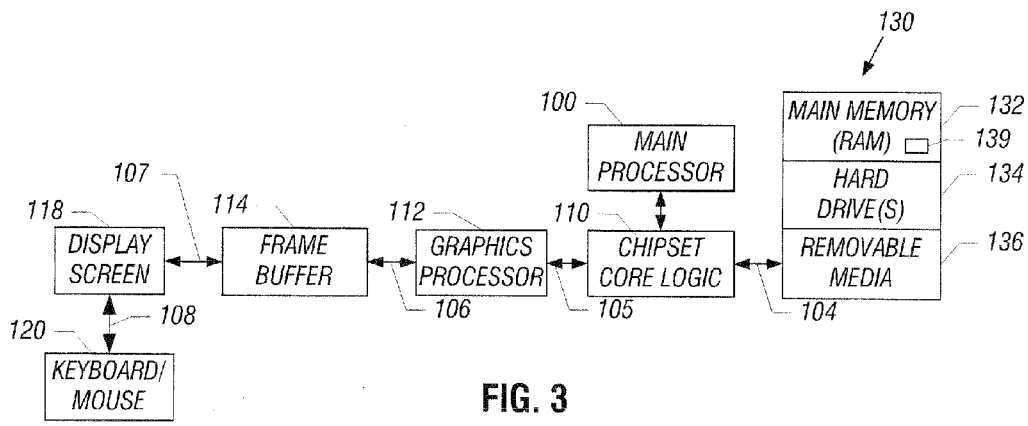
FIG. 3 is a schematic depiction of one embodiment.

A computer system 130, shown in FIG. 3, may include a hard drive 134 and a removable medium 136, coupled by a bus 104 to a chipset core logic 110. The core logic may couple to a graphics processor 112 (via bus 105) and the main processor 100, in one embodiment. The graphics processor 112 may also be coupled by a bus 106 to a frame buffer 114. The frame buffer 114 may be coupled by a bus 107 to a display screen 118, in turn coupled to conventional components by a bus 108, such as a keyboard or mouse 120.

In the case of a software implementation, the pertinent code, to implement the sequence 10, may be stored in any suitable semiconductor, magnetic, or optical memory, including the main memory 132. Thus, in one embodiment, the code 139 may be stored in a machine readable medium, such as the main memory 132 or frame buffer 114, for execution by a processor, such as a processor 100 or a graphics processor 112.

In a software embodiment, the sequence 10, shown in FIG. 2, may be part of a graphics processor 112. However, the sequence may also be implemented in software stored in frame buffer 114 or in main memory 132, as indicated in 139. Of course, such software could be resident on the graphics processor 112 or any other storage device.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer executed method comprising:
    calculating lengths of minor and major axes of an elliptical filter region using two gradient vectors by a hardware graphics processor;
    developing a correction factor for said calculated lengths of minor and major axes by taking the cosine of an angle between the vectors times the square of a ratio of lengths of the vectors and scaling from 0 to 1 to a scaled range of 1 to square root of 2; and
    correcting the calculated lengths of minor and major axes to anisotropically filter graphical information by multiplying the correction factor times the major axis length and dividing the correction factor by the minor axis length.

2. The method of claim 1 including calculating based on a height of a vector for the minor axis above a vector for the major axis.

3. The method of claim 1 including calculating a height of a shorter gradient vector above a longer gradient vector.

4. The method of claim 3 including calculating the height as the absolute value of dudx*dvdy minus dvdx*dudy and dividing the calculated absolute value by the length of the longer gradient vector for the major axis, wherein u and v are texture space coordinates, x and y are screen space coordinates, and dudx and dvdx represent a distance along u and v axes in texture space that corresponds to moving one pixel along an x axis in pixel space and dudy and dvdy represent a distance along the u and v axes in texture space that corresponds to moving one pixel along a y axis in pixel space.

5. A non-transitory computer readable medium storing instructions executed by a computer to:
    calculate lengths of minor and major axes of an elliptical filter region using two gradient vectors;
    develop a correction factor for said calculated lengths of minor and major axes by taking the cosine of an angle between the vectors times the square of a ratio of lengths of the vectors and scale from 0 to 1 to a scaled range of 1 to square root of 2; and
    correct the calculated lengths of minor and major axes to anisotropically filter graphical information by multiplying the correction factor times the major axis length and divide the correction factor by the minor axis length.

6. The medium of claim 5 further storing instructions to use a height of a vector for the minor axis above a vector for the major axis as the minor axis length.

7. The medium of claim 6 further storing instructions to calculate the height of the vector for the minor axis above the vector for the major axis as the absolute value of dudx*dvdy minus dvdx*dudy and divide the calculated absolute value by the length of the vector for the major axis, wherein u and v are texture space coordinates, x and y are screen space coordinates, and dudx and dvdx represent a distance along u and v axes in texture space that corresponds to moving one pixel along an x axis in pixel space and dudy and dvdy represent a distance along the u and v axes in texture space that corresponds to moving one pixel along a y axis in pixel space.

8. An apparatus comprising:
    a processor to calculate lengths of minor and major axes of an elliptical filter region using two gradient vectors, develop a correction factor for said calculated lengths of minor and major axes by taking the cosine of an angle between the vectors times the square of a ratio of lengths of the vectors and scale from 0 to 1 to a scaled range of 1 to square root of 2, correct the calculated lengths of minor and major axes to anisotropically filter graphical information by multiplying the correction factor times the major axis length and divide the correction factor by the minor axis length; and
    a storage coupled to said processor.

9. The apparatus of claim 8, said processor to use a height of a shorter vector above a longer vector as the minor axis length.

10. The apparatus of claim 9, said processor to calculate the height as the absolute value of dudx*dvdy minus dvdx*dudy and divide the calculated absolute value by the length of a longer gradient vector for the major axis, wherein u and v are texture space coordinates, x and y are screen space coordinates, and dudx and dvdx represent a distance along u and v axes in texture space that corresponds to moving one pixel along an x axis in pixel space and dudy and dvdy represent a distance along the u and v axes in texture space that corresponds to moving one pixel along a y axis in pixel space.

* * * * *